P. C. Clapp,
Scissors.

N°. 56,668.   Patented July 24, 1866.

Witnesses:
Samuel N. Piper
J. Curtis

Inventor:
Perez C Clapp
by his Attorney,
R. H. Eddy

UNITED STATES PATENT OFFICE.

P. C. CLAPP, OF DORCHESTER, ASSIGNOR TO HIMSELF AND COTTON C. BRADBURY, OF MILTON, MASSACHUSETTS.

IMPROVEMENT IN SHEARS.

Specification forming part of Letters Patent No. 56,668, dated July 24, 1866.

*To all whom it may concern:*

Be it known that I, PEREZ C. CLAPP, of Dorchester, in the county of Norfolk and State of Massachusetts, have made a new and useful invention having reference to Scissors or Shears; and I do hereby declare the same to be fully described in the following specification and represented in the accompanying drawings, of which—

Figure 1:
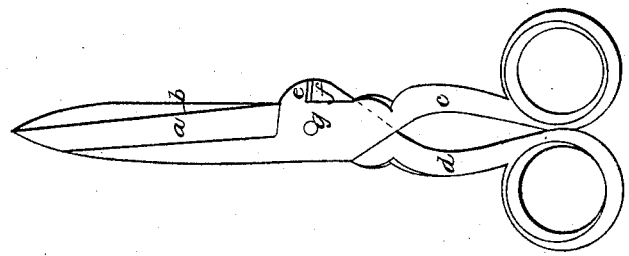
Figure 3:
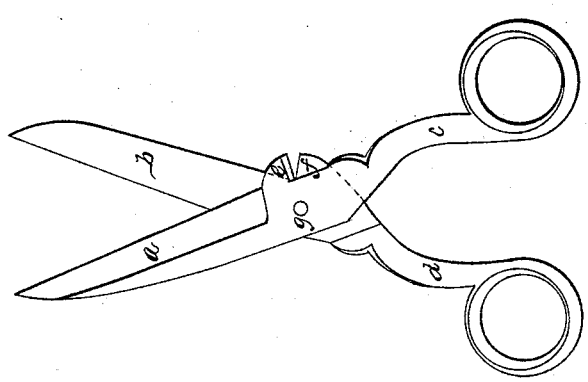
Figure 2:
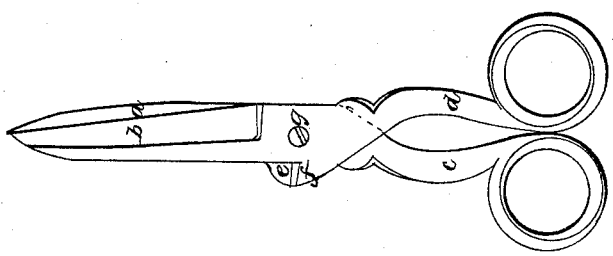

Figures 1 and 2 are opposite side views of a pair of my improved scissors in a closed state. Fig. 3 represents them as open.

The nature of my invention consists in a pair of scissors provided not only with handles and with blades in the ordinary way, but with an extra or auxiliary pair of short blades projecting from the handles at or near their junction with the main blades, the purpose of such short or auxiliary blades being to enable a person to cut a wire or a piece of metal or whalebone or other material which he may not wish to cut with the main blades on account of dulling or injuring their cutting-edges.

Scissors so made will be found very convenient for mantuamakers, milliners, tailors, tailoresses, or various other tradesmen or persons.

In the drawings, $a$ and $b$ are main blades; $c$, and $d$ the handles, and $g$ their fulcrum.

The shorter or auxiliary blades are represented at $e$ and $f$, one being extended from the handle $c$, and the other from the handle $d$, near the fulcrum, and at, or about at, right angles with the main blades. These blades or cutters may be arranged below the fulcrum and on the inner sides of the handles; but I prefer they should be disposed as represented in the drawings. The mode of using them will be apparent to any one skilled in the use of scissors.

I claim—

The scissors as made with the auxiliary blades $e\ f$, arranged and combined with the main blades $a\ b$ and their handles $c\ d$, substantially as specified.

P. C. CLAPP.

Witnesses:
R. H. EDDY,
F. P. HALE, Jr.